United States Patent
Washnock et al.

(10) Patent No.: US 11,597,427 B2
(45) Date of Patent: Mar. 7, 2023

(54) STEERING ACTUATORS FOR VEHICLES

(71) Applicant: Ford Global Technologies, LLC, Dearborn, MI (US)

(72) Inventors: Joseph Washnock, Canton, MI (US); Soungjin Jason Wou, Novi, MI (US); Jack Barry, Dearborn, MI (US); Jennifer Laz, West Bloomfield, MI (US); Garry Robert Smith, Grosse Pointe Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 130 days.

(21) Appl. No.: 17/079,076

(22) Filed: Oct. 23, 2020

(65) Prior Publication Data
US 2021/0039707 A1    Feb. 11, 2021

Related U.S. Application Data

(63) Continuation of application No. 15/985,310, filed on May 21, 2018, now Pat. No. 10,814,904.

(51) Int. Cl.
*B62D 3/08* (2006.01)
*B62D 5/04* (2006.01)
*B62D 7/18* (2006.01)

(52) U.S. Cl.
CPC ............ *B62D 3/08* (2013.01); *B62D 5/0424* (2013.01); *B62D 5/0448* (2013.01); *B62D 5/0454* (2013.01); *B62D 7/18* (2013.01)

(58) Field of Classification Search
CPC ...... B62D 3/08; B62D 5/0421; B62D 5/0424; B62D 5/0448; B62D 5/0454; B62D 7/18; F16H 25/2081; F16H 25/2204; F16H 25/2214

USPC .......................................................... 180/444
See application file for complete search history.

(56) References Cited

U.S. PATENT DOCUMENTS

| 2,855,791 | A | 10/1958 | Hogan |
| 4,593,780 | A | 6/1986 | Saito |
| 5,284,219 | A | 2/1994 | Shimizu et al. |
| 8,364,347 | B2 | 1/2013 | Tsukasaki et al. |
| 10,059,368 | B2 | 8/2018 | Sakaguchi et al. |

(Continued)

FOREIGN PATENT DOCUMENTS

| CN | 2710999 | 7/2005 |
| CN | 105313953 | 2/2016 |

(Continued)

OTHER PUBLICATIONS

United States Patent and Trademark Office, "Notice of Allowance," mailed in connection with U.S. Appl. No. 15/985,310, dated Jun. 24, 2020, 8 pages.

(Continued)

*Primary Examiner* — Kevin Hurley
*Assistant Examiner* — Felicia L. Brittman
(74) *Attorney, Agent, or Firm* — Lorne Forsythe; Hanley, Flight & Zimmerman LLC

(57) ABSTRACT

Steering actuators for vehicles are described herein. An example actuator includes a rack to be coupled to a knuckle of a vehicle, a ball nut coupled to the rack, a ring gear coupled to the ball nut, and a motor with a pinion engaged with the ring gear. The motor is to rotate the ball nut, via the pinion and the ring gear, to move the rack linearly.

20 Claims, 7 Drawing Sheets

(56) References Cited

U.S. PATENT DOCUMENTS

| | | | |
|---|---|---|---|
| 2007/0089926 A1 | 4/2007 | Jo et al. | |
| 2012/0241244 A1 | 9/2012 | Escobedo et al. | |
| 2014/0353068 A1* | 12/2014 | Yamamoto | B62D 5/0424 180/444 |
| 2019/0351932 A1 | 11/2019 | Washnock et al. | |
| 2020/0088596 A1 | 3/2020 | Hwang et al. | |

FOREIGN PATENT DOCUMENTS

| | | | |
|---|---|---|---|
| CN | 103465797 | 12/2016 | |
| DE | 102018119977 | 2/2020 | |
| DE | 102018119977 A1 * | 2/2020 | B62D 5/001 |
| JP | 5483729 | 2/2014 | |
| KR | 101428073 | 9/2014 | |

OTHER PUBLICATIONS

United States Patent and Trademark Office, "Non-final Office Action," mailed in connection with U.S. Appl. No. 15/985,310, dated Jan. 8, 2020, 10 pages.

* cited by examiner

STEERING ACTUATORS FOR VEHICLES

RELATED APPLICATION

This patent arises from a continuation of U.S. application Ser. No. 15/985,310 (now U.S. Pat. No. 10,814,904), titled "Steering Actuators for Vehicles," filed May 21, 2018, which is hereby incorporated by this reference in its entirety.

FIELD OF THE DISCLOSURE

This disclosure relates generally to vehicles and, more particularly, to steering actuators for vehicles.

BACKGROUND

Known vehicles typically include a mechanical linkage that connects the steering wheel to the front wheels of the vehicle and enables a driver to steer the vehicle by rotating the steering wheel. For example, many known steering systems include rack and pinion gears that translate rotational motion of a steering wheel to linear actuation or movement of one or more tie rods, which are connected to the front wheels of the vehicle. The tie rods change the angle of the front wheels, thereby turning the wheels and steering the vehicle.

In recent years, steer-by-wire systems and autonomous driving systems have been implemented in vehicles. These systems eliminate traditional mechanical linkage assemblies between the steering wheel and the wheels of the vehicle. Instead, an actuator operates to turn the wheels based on a measured rotational angle of the steering wheel or an instruction from an autonomous driving program.

SUMMARY

An example actuator for steering a vehicle is disclosed herein. The example actuator includes a rack to be coupled to a knuckle of the vehicle, a ball nut coupled to the rack, a ring gear coupled to the ball nut, and a motor with a pinion engaged with the ring gear. The motor is to rotate the ball nut, via the pinion and the ring gear, to move the rack linearly.

Another example actuator disclosed herein includes a rack, a ball nut coupled to the rack, and a motor to rotate the ball nut. The ball nut, when rotated, is to move the rack in a linear direction. The actuator also includes a slide rod and a slide locator coupled to an extending from the rack. The slide locator is slidable along the slide rod. An interface between the slide rod and the slide locator is to prevent rotation of the rack as the ball nut rotates.

A vehicle disclosed herein includes a steering knuckle and a tie rod. A first end of the tie rod is coupled to the steering knuckle. The vehicle also includes an actuator including a rack, where a second end of the tie rod coupled to the rack, a ball nut coupled to the rack, a ring gear coupled to and disposed around the ball nut, and a motor to drive the ring gear to rotate the ball nut.

Figure 1:
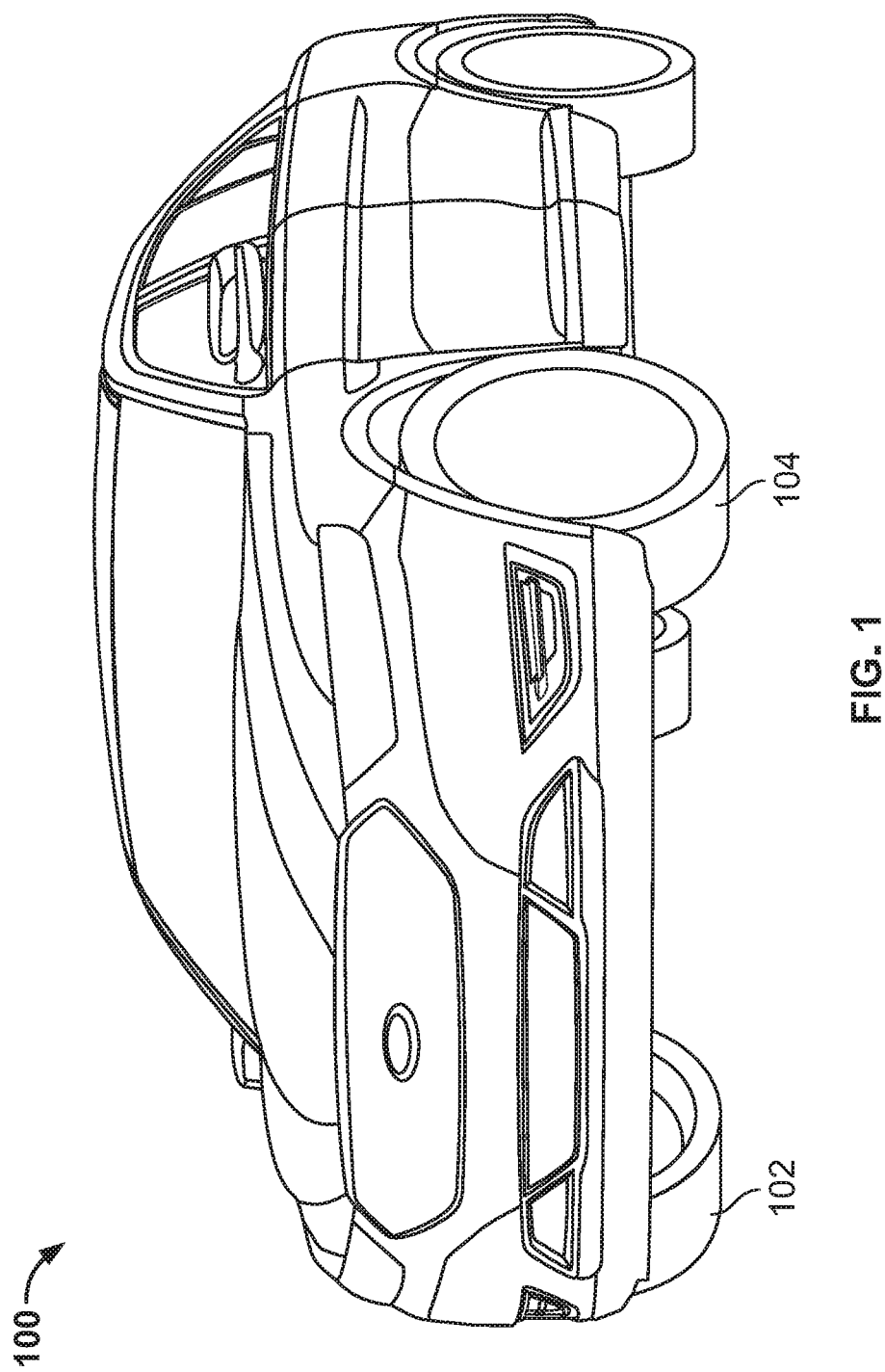
FIG. 1 illustrates an example vehicle in which example actuators disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example actuators that may be used for steering a vehicle, such as a steer-by-wire vehicle and/or an autonomous vehicle. The example actuators disclosed herein utilize smaller, lighter motors than known steering actuators while still producing sufficient power for controlling the steering of the vehicle. Further, the example actuators disclosed herein are smaller and, thus, require less room than known steering actuators. Before disclosing the example actuators and related aspects in detail, a brief description of known steer-by-wire systems is provided below.

In known steer-by-wire vehicles, the steering wheel of the vehicle is not directly mechanically connected to the wheels. Instead, a sensor measures a steering wheel angle (SWA) of the steering wheel and an actuator is activated (e.g., via a controller or an electronic control unit (ECU)) to turn the wheels in one direction or the other direction based on the measured SWA. Autonomous vehicles similarly utilize steering actuators to turn the wheels for steering the vehicle.

Known steering actuators utilize belt and pulley systems to transfer rotational motion from a motor to a nut, which drives a rack in a linear direction for turning the wheels. However, the belts often fail, thereby rendering the steering actuator inoperable. Also, belts commonly lose tension over time and, thus, require periodic maintenance and/or replacement. Further, belt and pulley systems are limited in the drive ratios between the motor and the nut. As such, known steering actuators generally require larger, heavier motors. These large, bulky motors require significant space in the vehicle, add weight to the vehicle, and utilize/draw higher power.

Disclosed herein are example steering actuators that may be used to turn a wheel of a vehicle to steer the vehicle. The example actuators may be used in steer-by-wire vehicles and/or autonomous vehicles, for example. An example actuator disclosed herein includes a rack, a ball nut coupled to the rack, and an electric motor. The rack is to be coupled to a steering knuckle in the vehicle. In some examples, the rack is coupled to the steering knuckle via a tie rod. The ball nut includes an opening and the rack extends through the opening. The motor, when activated, rotates or spins the ball nut, which causes the rack to move linearly, thereby turning the steering knuckle and steering the vehicle. In some examples, the actuator includes a housing that contains the rack, the ball nut, and the motor. The actuator operates by moving the rack outward from or into an opening in the housing. The housing may be coupled to a structure (e.g., a cross-bar) in the vehicle adjacent the steering knuckle.

To transfer rotational motion from the motor to the ball nut, example actuators disclosed herein utilize a ring gear and a pinion. For example, the actuator may include a ring gear that is coupled to and disposed around an outside of the ball nut. The ring gear is fixedly coupled to the ball nut and, thus, rotates with the ball nut. The motor includes an output shaft with a pinion that is engaged with the ring gear. The motor, when activated, rotates the pinion, which rotates the ring gear, thereby rotating the ball nut and causing the rack to move linearly. Thus, unlike the belt systems of the known actuators, example actuators disclosed herein utilize a gears to transfer rotational motion. The ring gear and pinion, which may be constructed of metal, form a stronger and more reliable interface than a belt and pulley connection. Further, the ring gear and pinion gear can achieve a higher drive ratio (gear ratio) than capable with a belt and pulley system. This drive ratio is further increased by using the ball nut and rack and, thus, extremely high drive ratios (gear reduction ratios) are possible with the example actuator. With such a high drive ratio, the motor can be significantly smaller in size and power while still producing the sufficient torque on the ball nut to move the rack. As such, smaller, lighter motors can be implemented with the example actuators. Smaller, lighter motors reduce the total weight of the vehicle and require less power than the larger motor used in the known actuators.

In some examples, the motor (e.g., the body of the motor) and the output shaft of the motor are aligned along an axis that is parallel to and offset from an axis of the rack (e.g., a longitudinal axis, a linear movement axis, etc.). This arrangement enables the motor and the rack to remain relatively close together, thereby creating a more compact actuator that consumes less space in the vehicle.

In some examples, the example actuator includes an anti-rotation device that is used to prevent the rack from rotating as the ball nut spins. In particular, when spinning a nut, a rack or screw within the nut has a tendency to rotate with the nut rather than being moved linearly. To prevent this rotation, the example actuator may include a slide rod and a slide locator. The slide rod may be disposed adjacent to and extend along at least a portion of the rack. The slide locator is coupled to and extends from the rack. The slide locator is slidable along the slide rod. As the rack moves linearly, the slide locator slides along the slide rod. The interface between the slide rod and the slide locator prevents the rack from rotating. Thus, the rack can only move linearly when the ball nut is rotated.

Example actuators disclosed herein may be used to independently steer the wheels of a vehicle. For example, one actuator may be associated with one wheel, and a second actuator may be associated with another wheel. The actuators independently operate to turn the wheels. In other examples, two actuators may be mechanically coupled to move the wheels in unison.

FIG. 1 illustrates an example vehicle 100 in which example actuators disclosed herein may be implemented. In the illustrated example, the vehicle 100 is depicted as a car (e.g., a sedan). However, in other examples, the vehicle 100 may be implemented as any other type of vehicle, such as a pick-up truck, a van, an all-terrain vehicle (ATV), etc. The vehicle 100 includes a first front wheel 102 (right wheel) and a second front wheel 104 (left wheel) that may be turned or angled to steer the vehicle 100. The vehicle 100 may be a steer-by-wire vehicle and/or capable of operating in an autonomous driving mode.

Figure 2:
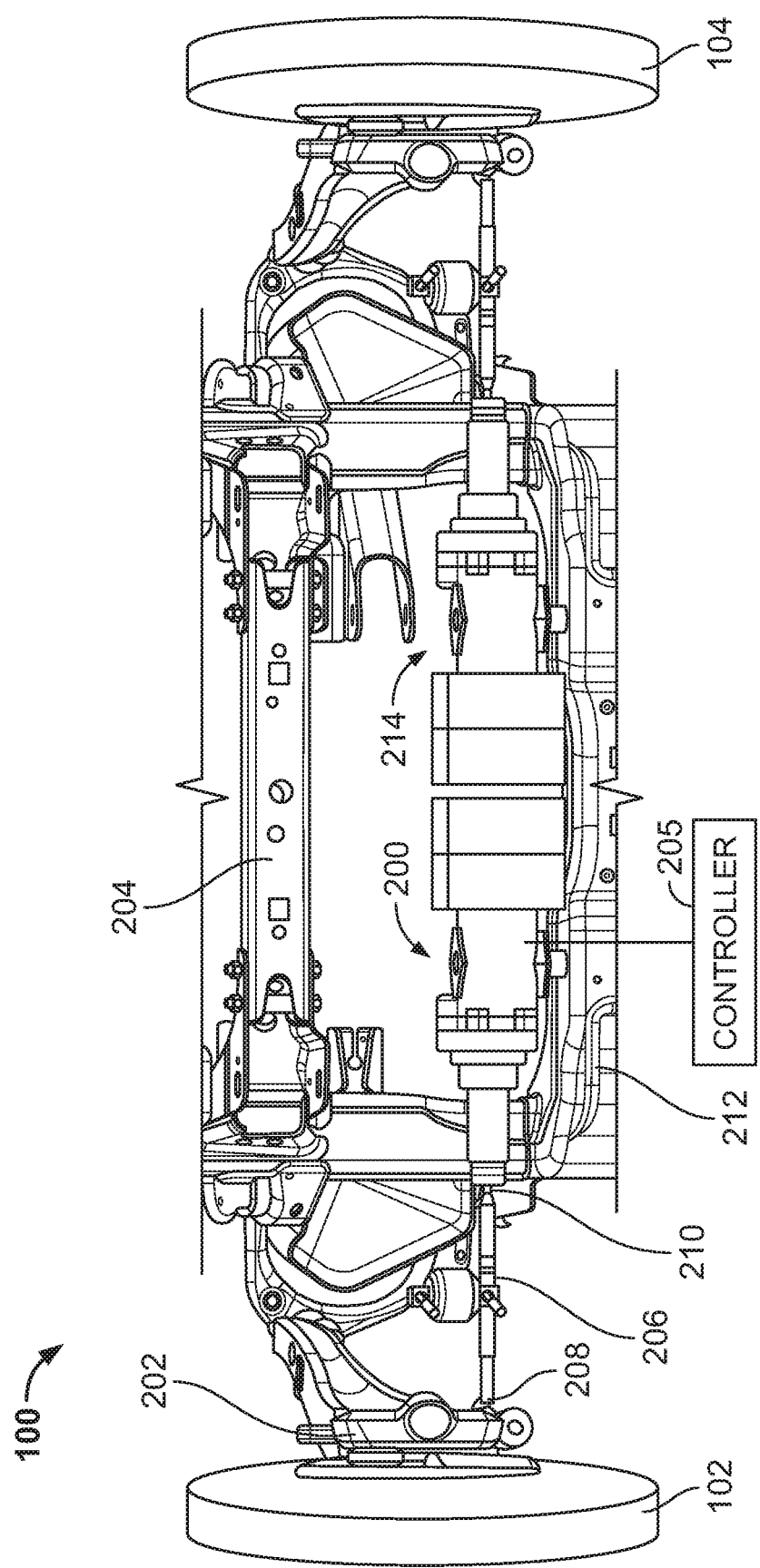
FIG. 2 is a bottom view of the example vehicle of FIG. 1 showing an example actuator constructed in accordance with the teachings of this disclosure.

FIG. 2 is a bottom view of a portion of the undercarriage of the vehicle 100 (without the body of the vehicle 100) showing an example actuator 200 that may be used to steer the vehicle 100. As illustrated in FIG. 2, the vehicle 100 includes a steering knuckle 202 (referred to herein as the knuckle 202). The first front wheel 102 is coupled to the knuckle 202. The knuckle 202 is pivotably coupled to a frame 204 of the vehicle 100. The knuckle 202 pivots to turn the first front wheel 102 (e.g., to the left or right).

To rotate the knuckle 202 and the first front wheel 102, the example vehicle 100 employs the example actuator 200. The actuator 200 is a linear actuator that is coupled to the knuckle 202. The actuator 200 operates to rotate the knuckle 202 (and, thus, the first front wheel 102) back-and-forth, thereby turning the first front wheel 102 and steering the vehicle 100. In the illustrated example, the actuator 200 is activated by a controller 205. The controller 205 may be part of and receive commands from a steer-by-wire system (e.g., based on a steering wheel angle) and/or from an autonomous driving mode program.

In the illustrated example, the actuator 200 is coupled to the knuckle 202 via a tie rod 206 of the vehicle 100. The tie rod 206 has a first end 208 and a second end 210 opposite the first end 208. The first end 208 of the tie rod 206 is coupled to the knuckle 202 and the second end 210 of the tie rod 206 is coupled to the actuator 200. The actuator 200 may be activated to extend and/or retract the tie rod 206 (e.g., move the tie rod 206 left or right in FIG. 2) to turn or angle the knuckle 202 and the first front wheel 102, thereby steering the vehicle 100. In the illustrated example, the actuator 200 is coupled to a cross-bar 212 of the frame 204 extending across a width of the vehicle 100. In other examples, the actuator 200 may be coupled to one or more other members of the frame 204.

In the illustrated example, the vehicle 100 includes a second actuator 214 for turning the second front wheel 104. The second actuator 214 is substantially the same as the actuator 200. Thus, to avoid redundancy, a description of the second actuator 214 is not provided. However, it is understood that any of the structures and/or functions disclosed in connection with the actuator 200 can likewise be applied to the second actuator 214. Further, other actuators may be similarly utilized in connection with other wheels of the vehicle 100, such as the rear wheels of the vehicle 100. The actuators 200, 214 operate independently to steer the respective first and second front wheels 102, 104. In other words, activation of the actuator 200 does not affect the steering of the second front wheel 104. Independent control of each wheel enables a smaller turning radius, for example. Further, by not having a mechanical linkage/steering assembly between the knuckles, use of the actuators 200, 214 frees up valuable space in the under carriage of the vehicle 100. The second actuator 214 may be controlled via the same controller 205 or a different controller. In the illustrated example, the second actuator 214 is coupled to the cross-bar 212 adjacent the actuator 200.

In some examples, the actuator(s) 200, 214 is/are part of a steer-by-wire system for the vehicle 100. In a steer-by-wire system, a steering wheel angle (SWA) sensor is used to measure the rotational angle of a steering wheel. The controller 205 activates the actuator(s) 200, 214 to turn the respective first and second front wheels 102, 104 based on the SWA. The controller 205 may apply a linear or non-linear relationship between the SWA and the angle of the first and second front wheels 102, 104. Additionally or alternatively, the actuator(s) 200, 214 may be utilized by an autonomous driving program to autonomously steer the vehicle 100.

While in the illustrated example the actuators 200, 214 are shown as separate actuators, in other examples, the actuators 200, 214 may be integrated and/or operate as a single actuator. For example, the knuckles may be mechanically coupled (e.g., via one or more struts or tie rods), such that the turning one wheel affects the other wheel. In such an example, the actuators 200, 214 may operate in unison to steer the first and second front wheels 102, 104.

In the illustrated example, the actuator 200 is not mechanically connected to or operated by the steering wheel assembly. However, in other examples, the actuator 200 may be activated via physical input from a steering assembly. For example, the actuator 200 may be incorporated as part of an electronic power assisted steering (EPAS) system.

Figure 3:
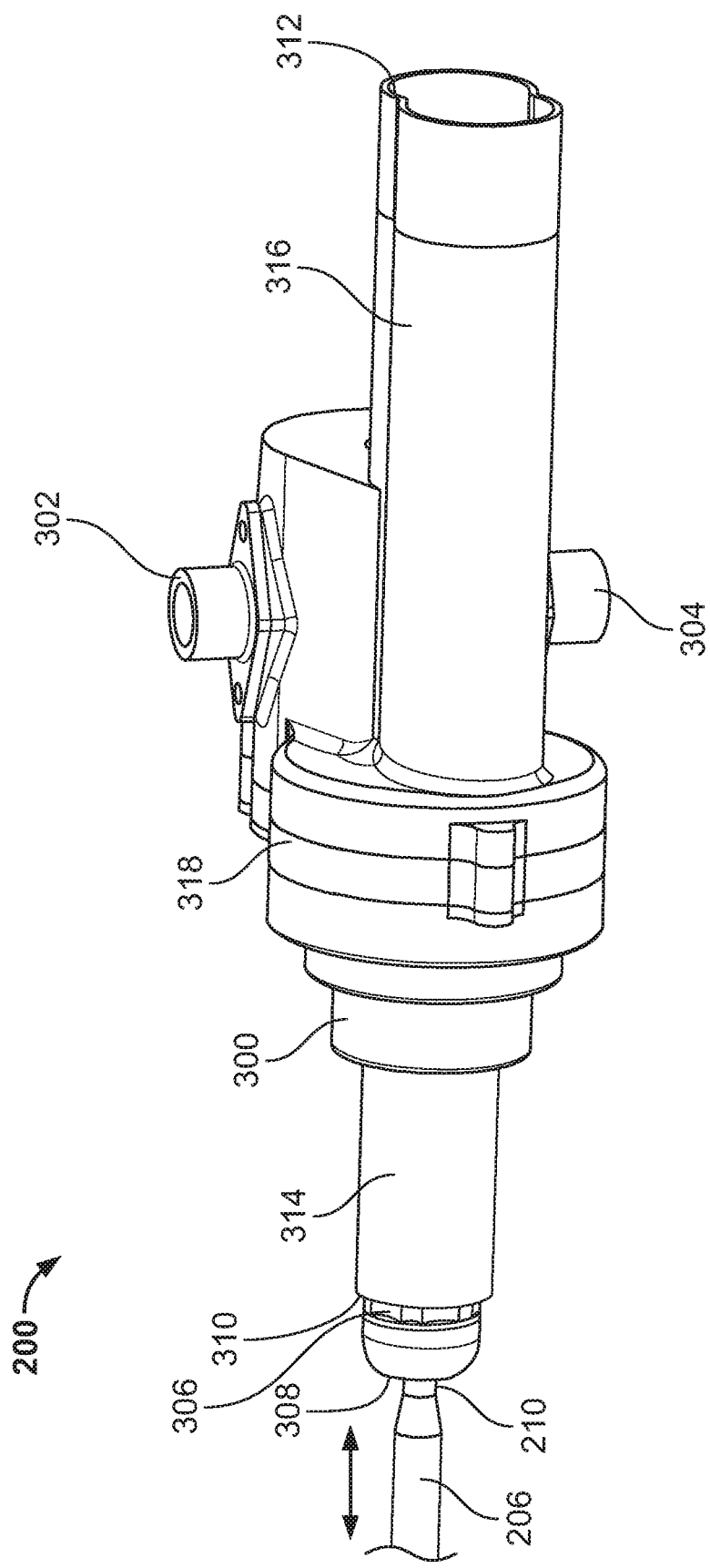
FIG. 3 is an isolated perspective view of the example actuator of FIG. 2.

FIG. 3 is an isolated perspective view of the example actuator 200. As shown in FIG. 3, the actuator 200 includes a housing 300. The housing 300 contains the internal components of the actuator 200 (e.g., a ball nut, a rack, a motor, etc.) disclosed in further detail herein. In the illustrated example, the actuator 200 includes a first mount 302 that is coupled to the housing 300. The first mount 302 is used to couple the actuator 200 to another structure, such as the cross-bar 212 in the vehicle 100 as shown in FIG. 2. In some examples, the actuator 200 includes a second mount 304 (disposed on the opposite side of the housing 300 than the first mount 302), which may be used in addition to or as an alternative to the first mount 302 to couple the actuator 200 to the vehicle 100. In some examples, the actuator 200 is reversible, and may be used for either the first front wheel 102 or the second front wheel 104. For example, if the actuator 200 is used with the first front wheel 102, the first mount 302 can be used to couple the actuator 200 to the vehicle 100 or, if the actuator 200 is used with the second front wheel 104, the second mount 304 can be used to couple the actuator 200 to the vehicle 100.

In the illustrated example, the actuator 200 includes a rack 306 (which may be referred to as a screw or ball screw). A first end 308 of the rack 306 extends outward from an opening in a first end 310 of the housing 300. The housing 300 has a second end 312 opposite the first end 310. In the illustrated example, the second end 210 of the tie rod 206 is coupled to the first end 308 of the rack 306. The actuator 200 operates to move the rack 306 linearly between a fully retracted position (a first position), as shown in FIG. 3, and a fully extended position (a second position), in which the first end 308 of the rack 306 is moved outward, away from the first end 310 of the housing 300. In some examples, the tie rod 206 is coupled to the rack 306 via a ball joint, such that the tie rod 206 can pivot relative to the rack 306. In other examples, the tie rod 206 is coupled to the rack 306 via a fixed joint. The actuator 200, when activated, operates to move the rack 306 in a linear direction outward from or into the opening in the first end 308 of the housing 300, thereby moving the tie rod 206 to steer the first front wheel 102. In some examples, a boot or bellows is used to cover the opening in the first end 310 of the housing 300 to prevent dirt, water, and/or other debris from entering the housing 300 as the rack 306 is moved into and out of the housing 300. The boot or bellows may be coupled to the housing 300 and the tie rod 206, for example. In other examples, instead of utilizing the tie rod 206, the rack 306 may be coupled directly to the knuckle 202.

In some examples, the housing 300 is constructed of two or more portions or sections. For example, in the illustrated example of FIG. 3, the housing 300 includes a first section 314, a second section 316, and a third section 318. The third section 318 is disposed between the first and second sections 314, 316. In the illustrated example, the first and second sections 314, 316 couple together at the third section 318 and form an enlarged area (e.g., having an enlarged diameter) that houses a ball nut, as disclosed in further detail herein. While in the illustrated example three housing sections are implemented, in other examples, the housing 300 may be constructed of more or fewer sections.

Figure 4:
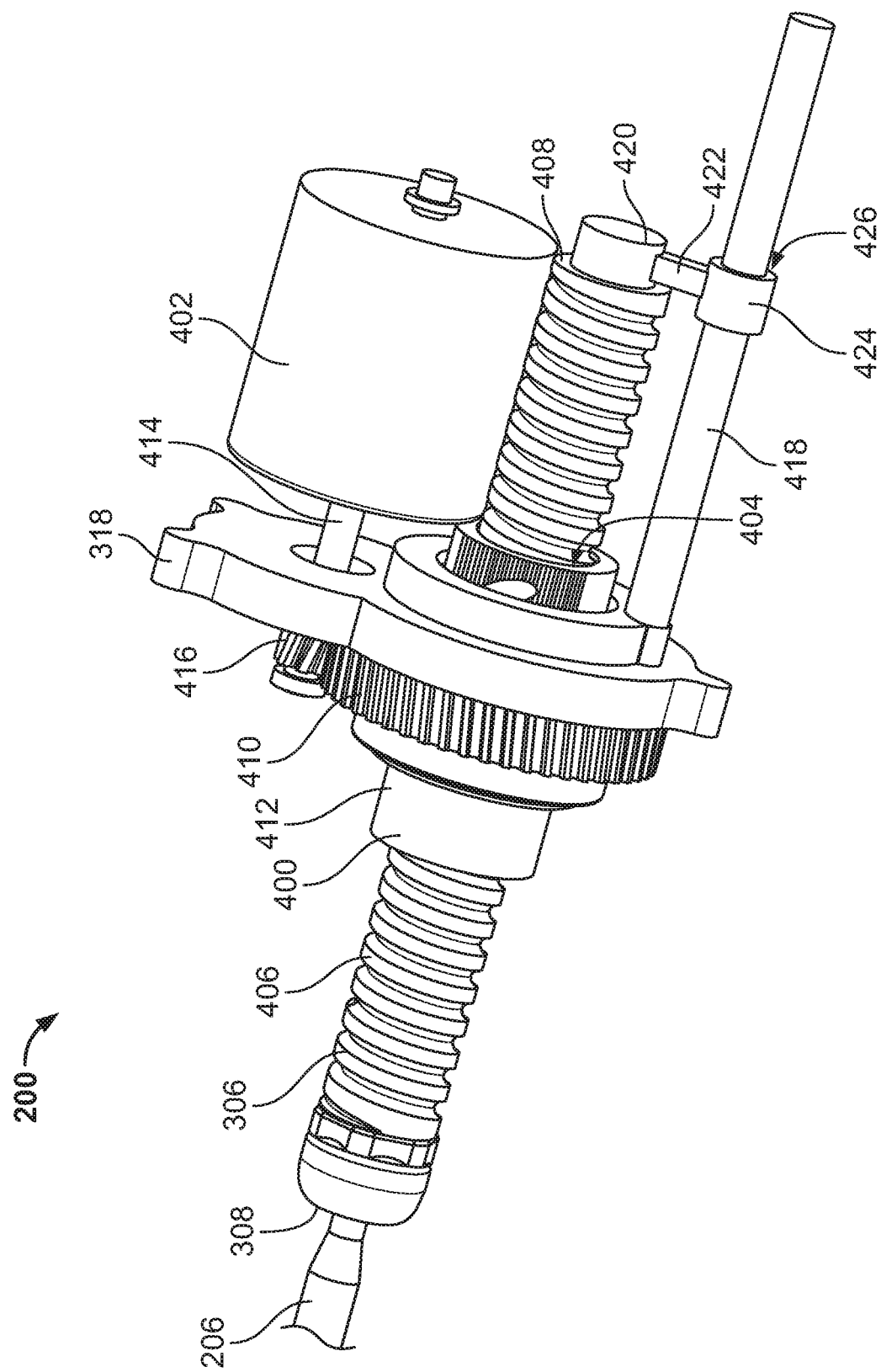
FIG. 4 is another perspective view of the example actuator of FIG. 2 in which a portion of a housing of the actuator has been removed to expose the internal component(s) of the example actuator.

FIG. 4 illustrates the actuator 200 with the first and second sections 314, 316 of the housing 300 (FIG. 3) removed. As shown in FIG. 4, the actuator 200 includes the rack 306, a ball nut 400 coupled to the rack 306, and a motor 402 (e.g., a brushless 3-phase direct current (DC) motor, an alternating current (AC) motor, etc.). When the actuator 200 is assembled, the rack 306, the ball nut 400, and the motor 402 are disposed within the housing 300 (FIG. 3). In particular, the rack 306 extends through the first, second, and third sections 314, 316, 318 of the housing 300. The motor 402 is disposed within and protected by the second section 316. The third section 318 aligns the ball nut 400 (between the first section 314 and the third section 318) and couples the first and second sections 314, 316.

In the illustrated example, the ball nut 400 is a sleeve defining an opening 404. The rack 306 is disposed within and extends through the opening 404 of the ball nut 400. The ball nut 400 is rotatable within the housing 300 (FIG. 3), but is not moveable linearly within the housing 300. In particular, as shown in FIG. 3, the section of the housing 300 that contains the ball nut 400 is enlarged, which enables the ball nut 400 to rotate but not move linearly in the housing 300. The rack 306 includes threads 406 extending along at least a portion of the rack 306 between the first end 308 and a second end 408 of the rack 306 opposite the first end 308. The ball nut 400 includes a series of bearing balls or rollers within the opening 404 that form a helical path that meshes with the threads 406 of the rack 306 (as shown in further detail in connection with FIGS. 7A and 7B). The motor 402, when activated, rotates the ball nut 400, which causes the rack to move linearly through the opening 404 of the ball nut 400 (left or right in FIG. 4 depending on the direction of rotation). The motor 402 is activated by the controller 205 (FIG. 2).

In the illustrated example, the actuator 200 includes a ring gear 410 that is coupled to and disposed around an outer surface 412 of the ball nut 400 (or, for example, it can be considered that the ring gear 410 includes an internal ball nut 400). The ring gear 410 is fixedly coupled to and rotates with the ball nut 400. The ring gear 410 may be coupled to the ball nut 400 via any mechanical and/or chemical fastening technique (e.g., via an adhesive, via a threaded fastener, via teeth, via friction fit, via welding, etc.). In other examples, the ring gear 410 may be integrally constructed with the ball nut 400 as a substantially unitary part or component (e.g., the ball nut 400 and the ring gear 410 may be molded or otherwise formed as a single piece).

To rotate the ball nut 400, the motor 402 of the example actuator 200 includes an output shaft 414 with a pinion 416 (sometimes referred to as spur gear). The pinion 416 is engaged with (e.g., meshed with) teeth of the ring gear 410.

The motor 402, when activated, rotates the pinion 416, which rotates the ring gear 410, thereby rotating the ball nut 400. In this example, the motor 402 is a bidirectional motor that can rotate the pinion 416 (and, thus, the ball nut 400) in either direction. When the ball nut 400 is rotated in one direction, the rack 306 moves linearly in one direction, and when the ball nut 400 is rotated in the opposite direction, the rack 306 moves linearly in the opposite direction. Therefore, the motor 402 rotates the ball nut 400, via the pinion 416 and the ring gear 410, to move the rack 306 in a linear direction. The motor 402 can be a relatively small motor with low torque output, such as 2-5 newton-metre (Nm). In other examples, the motor 402 can be sized to output more or less torque.

The pinion 416 and ring gear 410 can be sized to provide a relatively high reduction gear ratio, such as 7:1, 10:1, 20:1, etc. With such a high gear reduction ratio, the motor 402 can be have a relatively low output torque while still generating high linear output force on the rack 306. Further, the ball nut 400 and the rack 306 form another gear reduction point. Therefore, a double gear reduction system is formed. In particular, a first gear reduction occurs between the pinion 416 and the ring gear 410, and a second gear reduction occurs between the ball nut 400 and the rack 306. This double gear reduction can achieve extremely high gear reduction ratios, such as 1000:1, for example, or higher. Thus, a relatively smaller, lower power motor can be implemented to generate high linear power on the rack 306.

To prevent the rack 306 from rotating as the ball nut 400 spins, the actuator 200 includes a slide rod 418 and a slide locator 420. In general, when the ball nut 400 spins, the rack 306 has a tendency to rotate with the ball nut 400 rather than move linearly. Therefore, the slide rod 418 may be employed to prevent this undesired rotation. In the illustrated example, the slide rod 418 extends along at least a portion of the rack 306. In some examples, the slide rod 418 is parallel to the rack 306. The slide rod 418 remains fixed or stationary. In the illustrated example, the slide rod 418 is coupled to and extends from the third section 318 of the housing 300 (FIG. 3). Thus, the slide rod 418 remains stationary relative to the housing 300. In other examples, the slide rod 418 may be coupled to another section of the housing 300 and/or another structure (e.g., to the cross-bar 212 (FIG. 2) adjacent the actuator 200). When the actuator 200 is assembled, the slide rod 418 is disposed within the housing 300 (FIG. 3) (e.g., within the second section 316 of the housing 300 with the rack 306).

In the illustrated example, the slide locator 420 is coupled to and extends outward from the rack 306. The slide locator 420 is slidable along the slide rod 418. As the rack 306 translates back-and-forth, the slide locator 420 slides along the slide rod 418 and prevents the rack 306 from rotating. In the illustrated example, the slide locator 420 includes an arm 422 and a sleeve 424 coupled to an end of the arm 422. The sleeve 424 includes an opening 426 that receives the slide rod 418. As the rack 306 moves linearly (left and right), the sleeve 424 slides and/or otherwise moves along the slide rod 418. The interface between the slide rod 418 and the slide locator 420 prevents the slide locator 420 from rotating and, thus, prevents the rack 306 from rotating. In the illustrated example, the slide locator 420 is fixedly coupled to the second end 408 of the rack 306. However, in other examples, the slide locator 420 may be coupled to another location on the rack 306. In some examples, by having the slide rod 418 disposed along the side of the rack 306, instead of using an in-line device, the slide rod 418 enables the actuator 200 to be shorter in the axial direction, thereby consuming less space in the vehicle 100. In other examples, other types of tracks or structures may be used to prevent rotation of the rack 306.

Figure 5:
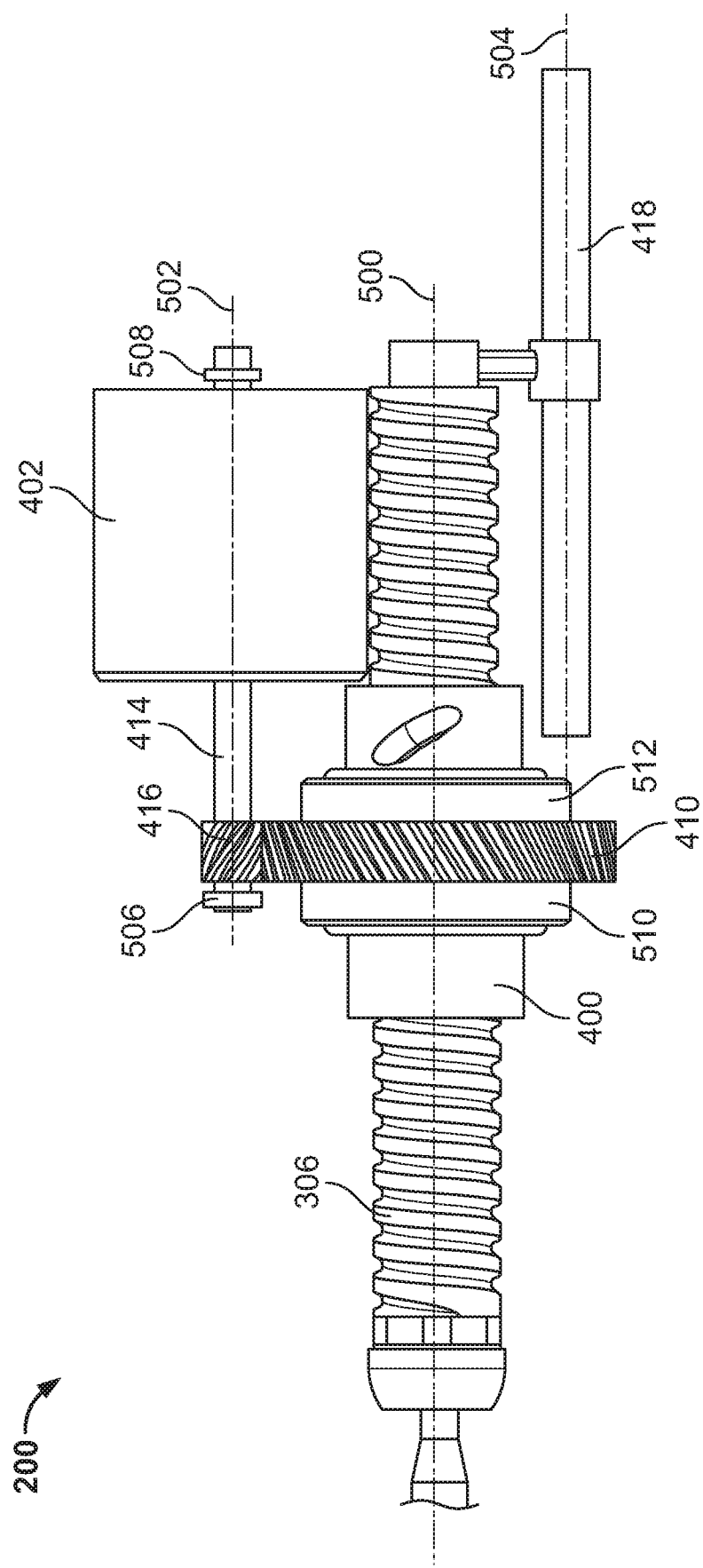
FIG. 5 is a side view of the actuator of FIG. 2 without the housing.

FIG. 5 is a side view of the actuator 200 with the housing 300 (FIG. 3) removed. As the ball nut 400 is rotated, the rack 306 moves linearly along a first axis 500 (to the left and right in FIG. 5), which is coaxial with the longitudinal axis of the rack 306. As illustrated in FIG. 5, the motor 402 (e.g., the body of the motor 402), the output shaft 414, and the pinion 416 (e.g., a rotational axis of the pinion 416) are aligned along a second axis 502. In this example, the second axis 502 is parallel to and offset from the first axis 500 (the longitudinal axis of the rack 306). This arrangement enables the rack 306 and the motor 402 to remain close together and, thus, reduces the overall space occupied by the actuator 200. As such, the actuator 200 is more compact than known actuators. In some examples, the slide rod 418 is aligned along a third axis 504 that is also parallel to and offset from the first axis 500 and the second axis 502.

As shown in FIG. 5, a first bushing or bearing 506 is coupled to an end of the output shaft 414. When the actuator 200 is assembled, the first bushing or bearing 506 is disposed in a recess formed in the housing 300 (FIG. 3), which enables the output shaft 414 to rotate smoothly. In some examples, the output shaft 414 extends from the opposite side of the motor 402, and a second bushing or bearing 508 is coupled to the opposite end of the output shaft 414. In other examples, the output shaft 414 may not extend from the opposite side of the motor 402. Instead, the opposite side of the motor 402 may be supported by and/or coupled to the housing 300 via a bushing or motor mount.

As shown in FIG. 5, the actuator 200 includes a first bearing 510 coupled to the ball nut 400. The first bearing 510 is disposed between the ball nut 400 and an inner surface of the housing 300 (FIG. 3), which enables the ball nut 400 to rotate smoothly within the housing 300. In some examples, the actuator 200 includes a second bearing 512 that is coupled to the ball nut 400 and disposed between the ball nut 400 and the housing 300. In some examples, the first bearing 510 is disposed on one side of the ring gear 410 (e.g., on the left side as shown in FIG. 5) and the second bearing 512 is disposed on the opposite side of the ring gear 410 (e.g., on the right side as shown in FIG. 5).

Figure 6:
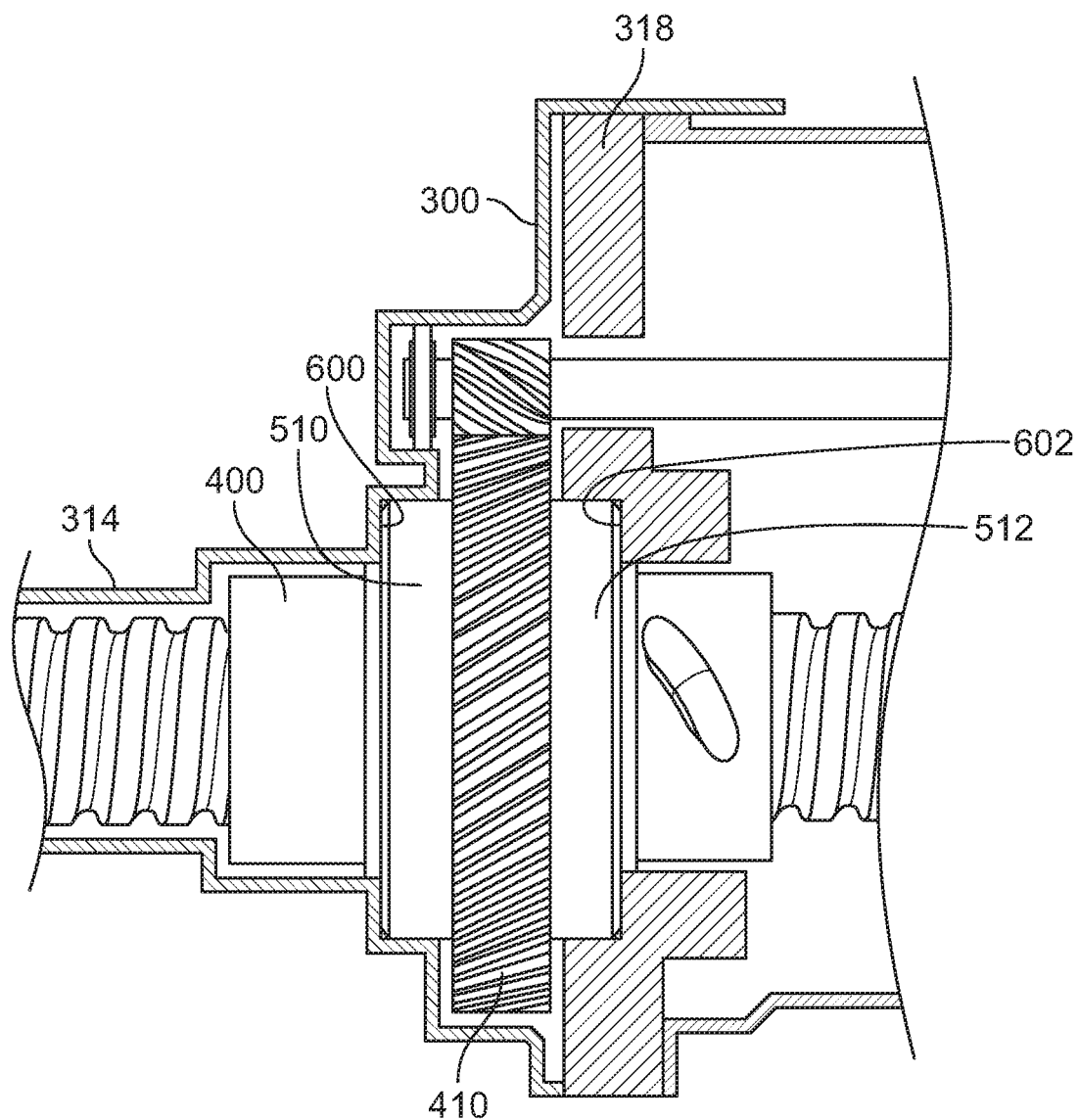
FIG. 6 is a partial cross-sectional view of a section of the actuator of FIG. 2.

FIG. 6 shows an enlarged view of the ball nut 400 and the first and second bearings 510, 512 within a partial cutaway of the housing 300. As shown in FIG. 6, the first bearing 510 is disposed between (e.g., engaged with) a first inner surface 600 of the first section 314 of the housing 300 and the ring gear 410. Similarly, the second bearing 412 is clamped between (e.g., engaged with) a second inner surface 602 of the third section 318 of the housing 300 and the other side of the ring gear 410. The first and second bearings 510, 512 enable the ball nut 400 to rotate smoothly within the housing 300. Further, in some examples, the first and second bearings 510, 512 are implemented as thrust bearings, which are constructed to support an axial load. In particular, as the ball nut 400 rotates and moves the rack 306 linearly, a reaction force pushes the ball nut 400 and the ring gear 410 in the opposite direction and, thus, into the housing 300. As such, the first and second bearings 510, 512 support the reaction force acting between the ball nut 400 and the ring gear 410 and the inner surfaces 600, 602 of the housing 300, thereby preventing the ball nut 400 and the ring gear 410 from binding against the housing 300. In other examples, the first and second bearings 510, 512 may be implemented as other types of bearings, such as radial bearings, dual angular bearings, and/or any other type of bearing. In some examples, only one of the bearings is used (e.g., only the first bearing 510 is used). In other examples, the actuator 200 may include more than two bearings between the ball nut 400 and the housing 300.

Figure 7A:
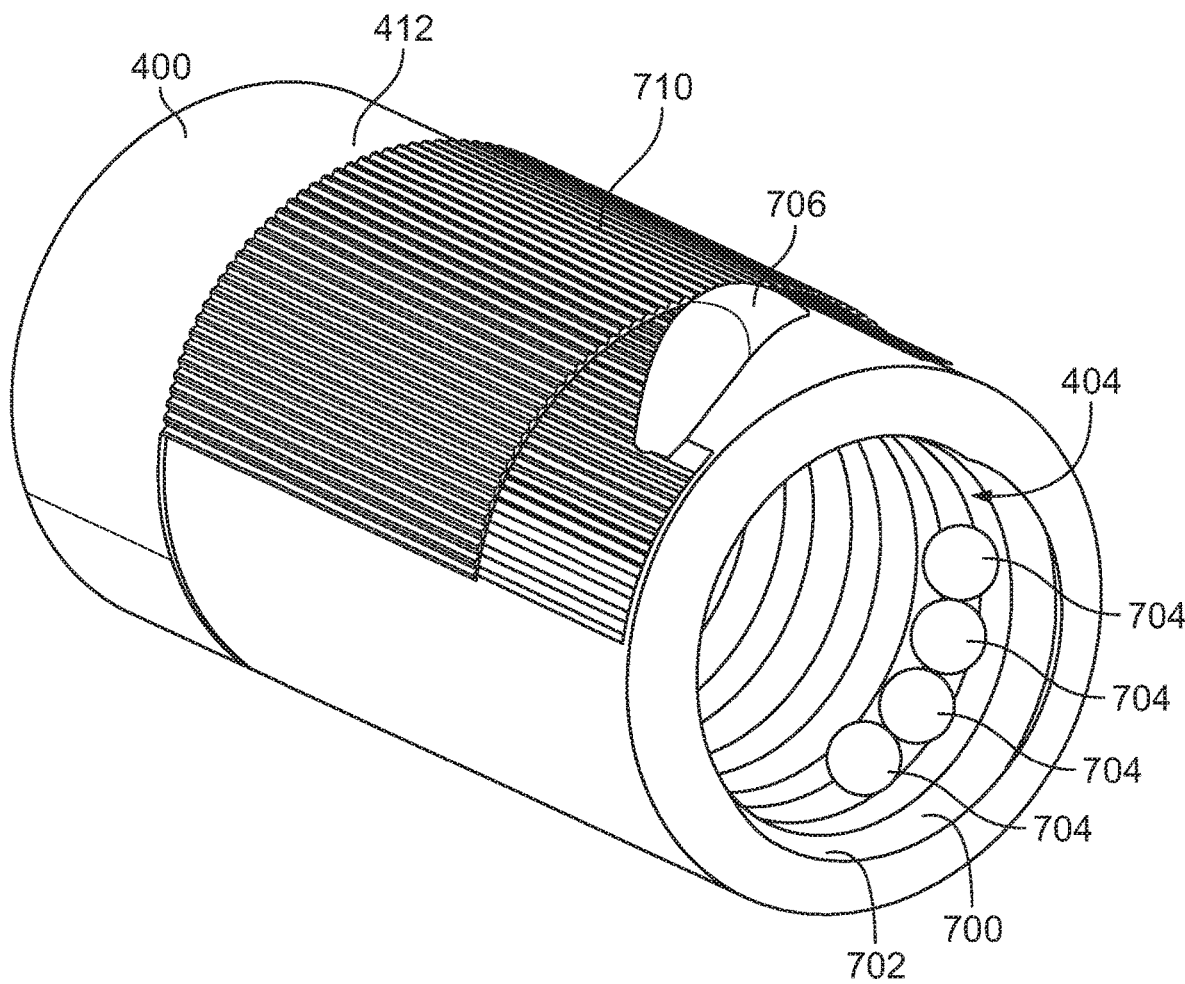
FIGS. 7A and 7B are isolated perspective views of an example ball nut that may be implemented in the example actuator of FIG. 2.
Figure 7B:
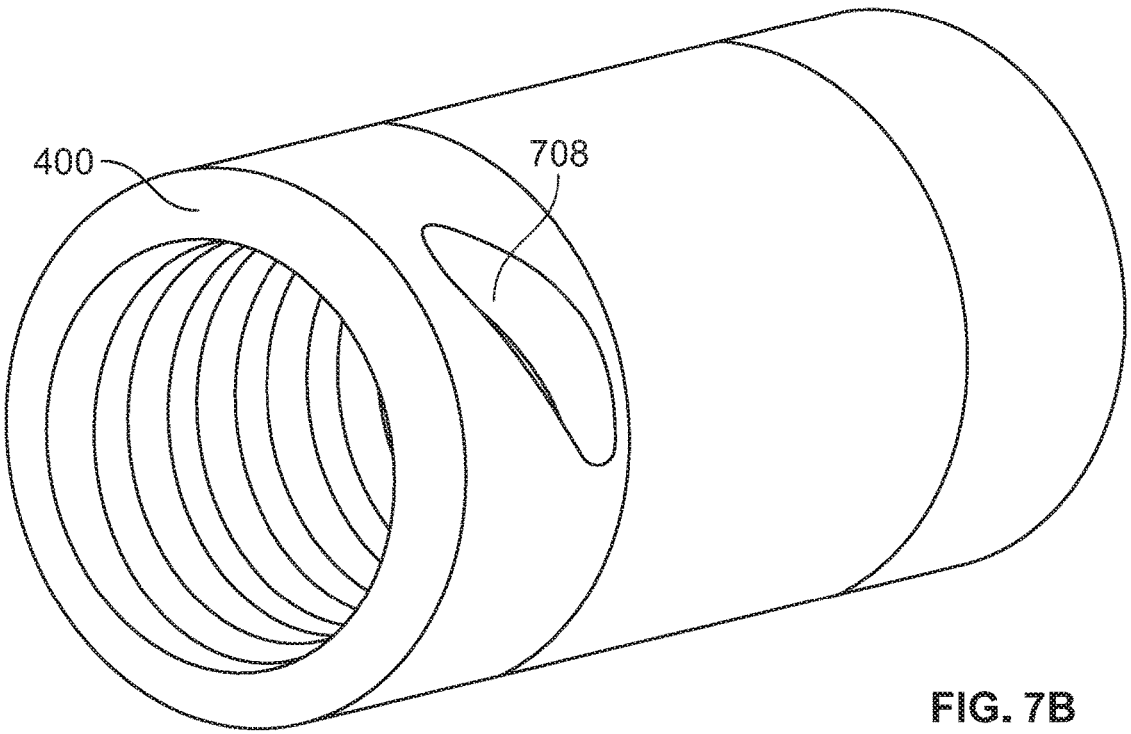

As disclosed above, the ball nut 400 contains recirculating bearing balls. FIG. 7A shows an isolated view of the ball nut 400. The opening 404 of the ball nut 400 includes threads 700 (forming a worm) around an inner surface 702 of the ball nut 400. A plurality of bearing balls 704 (e.g., steel balls) are disposed in the threads 700 of the opening 404. Only four bearing balls 704 are shown in FIG. 7A. However, it is understood that a continuous line or series of the bearings balls 704 may be disposed in the threads 700. The bearing balls 704 form a helical path, similar to threads in a regular nut, that mesh with the threads 406 (FIG. 4) on the rack 306. The ball nut 400 includes a first ball return tube 706, which is an external tube that connects two of the threads to form a closed loop for recirculating the bearing balls 704. As the ball nut 400 rotates, the bearing balls 704 may travel through the loop created by the threads 700 and the first ball return tube 706. Using the bearing balls 704 reduces friction between the ball nut 400 and the rack 306 compared to using a regular nut with threads. In some examples, the ball nut 400 is implemented as a double recirculating ball nut. For example, a second helical ball path may be formed near the other end of the ball nut 400. FIG. 7B shows the other end of the ball nut 400, which includes a second ball return tube 708 for recirculating bearing balls on the other end of the ball nut 400. In other examples, the ball nut 400 may be a single recirculating ball nut (e.g., having only one loop or path for the bearing balls 704) or may include more than two loops for the bearing balls 704.

As shown in the example of FIG. 7A, the outer surface 412 of the ball nut 400 includes splines 710. The splines 710 can mate (e.g., mesh) with splines on an inner surface of the ring gear 410 to couple the ball nut 400 and the ring gear 410 and/or otherwise prevent relative rotation between the ball nut 400 and the ring gear 410. In the illustrated example, the splines 710 extend partially around the circumference of the ball nut 400. In other examples, the splines 710 may continue completely around the ball nut 400. Additionally or alternately, in other examples, the ball but 400 and the ring gear 410 may be coupled via another mechanical and/or chemical fastening technique (e.g., via an adhesive, via a threaded fastener, via friction fit, via welding, etc.).

From the foregoing, it will be appreciated that example steering actuators have been disclosed that utilize smaller, lighter motors than known actuators. The example actuators disclosed herein utilize an arrangement of gears to produce high drive ratios that enables the use of smaller, lighter motors. Smaller, lighter motors reduce weight added to the vehicle and reduce the total amount of power required to operate the actuators. Also disclosed herein are example anti-rotation devices that prevent rotation of a rack, which ensures more power is utilized to move the rack linearly. While the example actuators disclosed herein are described in connection with vehicles, the example actuators can be used in other industries or applications.

The following paragraphs provide various examples of the examples disclosed herein.

Example 1 includes an actuator for steering a vehicle. The actuator includes a rack to be coupled to a knuckle of the vehicle, a ball nut coupled to the rack, a ring gear coupled to the ball nut, and a motor with a pinion engaged with the ring gear. The motor is to rotate the ball nut, via the pinion and the ring gear, to move the rack linearly.

Example 2 includes the actuator of Example 1, wherein an output shaft of the motor is aligned along an axis that is parallel to and offset from a longitudinal axis of the rack.

Example 3 includes the actuator of Examples 1 or 2, further including a housing. The ball nut is disposed within the housing. The ball nut is rotatable within the housing while not being linearly movable within the housing.

Example 4 includes the actuator of Example 3, further including a thrust bearing disposed between the ring gear and an inner surface of the housing.

Example 5 includes the actuator of any of Examples 1-4, further including a slide rod and a slide locator extending from the rack and slidable along the slide rod. The slide locator is to prevent the rack from rotating.

Example 6 includes the actuator of Example 5, wherein the slide locator is coupled to an end of the rack.

Example 7 includes the actuator of any of Examples 5 or 6, wherein the slide rod is parallel to and extends along at least a portion of the rack.

Example 8 includes the actuator of any of Examples 5-7, further including a housing. The rack and the slide rod are disposed within the housing.

Example 9 includes the actuator of any of Examples 1-8, wherein the ball nut is a double recirculating bull nut.

Example 10 includes an actuator including a rack, a ball nut coupled to the rack, and a motor to rotate the ball nut. The ball nut, when rotated, is to move the rack in a linear direction. The actuator of Example 10 also includes a slide rod and a slide locator coupled to an extending from the rack. The slide locator is slidable along the slide rod. An interface between the slide rod and the slide locator is to prevent rotation of the rack as the ball nut rotates.

Example 11 includes the actuator of Example 10, wherein the slide locator is coupled to an end of the rack.

Example 12 includes the actuator of Examples 10 or 11, further including a housing containing the rack, the ball nut, and the motor.

Example 13 includes the actuator of Example 12, wherein the slide rod is coupled to and remains stationary relative to the housing.

Example 14 includes the actuator of any of Examples 10-13, the slide rod is parallel to and extends along at least a portion of the rack.

Example 15 includes the actuator of Example 14, wherein an output shaft of the motor is aligned along an axis that is parallel to and offset from the rack and the slide rod.

Example 16 includes a vehicle including a steering knuckle, a tie rod, a first end of the tie rod coupled to the steering knuckle, and an actuator. The actuator includes a rack, a second end of the tie rod coupled to the rack, a ball nut coupled to the rack, a ring gear coupled to and disposed around the ball nut, and a motor to drive the ring gear to rotate the ball nut.

Example 17 includes the vehicle of Example 16, wherein the actuator further includes a slide rod and a slide locator extending from the rack and slidable along the slide rod. The slide locator is to prevent the rack from rotating.

Example 18 includes the vehicle of Examples 16 or 17, wherein an output shaft of the motor is aligned along an axis that is parallel to and offset from a longitudinal axis of the rack.

Example 19 includes the vehicle of any of Examples 16-18, wherein the actuator includes a housing containing the ring gear and a thrust bearing disposed between the ring gear and an inner surface of the housing.

Example 20 includes the vehicle of Example 19, wherein the thrust bearing is a first thrust bearing and the inner surface is a first inner surface, further including a second thrust bearing disposed between the ring gear and a second inner surface of the housing, wherein the first and second thrust bearings are disposed on opposite sides of the ring gear.

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

What is claimed is:

1. A steer-by-wire system for a vehicle, the steer-by-wire system comprising:
    a controller; and
    an actuator to, when activated by the controller, turn a wheel of the vehicle to steer the vehicle, the actuator including:
        a rack;
        a ball nut defining an opening, the rack extending through the opening of the ball nut;
        a slide rod;
        a slide locator coupled to the rack, the slide locator movable along the slide rod as the rack moves linearly to prevent the rack from rotating; and
        a motor to rotate the ball nut to move the rack linearly.

2. The steer-by-wire system of claim 1, wherein the slide locator is coupled to and extends from an end of the rack.

3. The steer-by-wire system of claim 1, wherein the slide rod is parallel to and adjacent at least a portion of the rack.

4. The steer-by-wire system of claim 1, wherein the slide locator includes:
    an arm extending from the rack; and
    a sleeve coupled to a distal end of the arm.

5. The steer-by-wire system of claim 4, wherein the slide rod extends through the sleeve.

6. The steer-by-wire system of claim 1, wherein the actuator includes a housing, the rack and the slide rod disposed within the housing.

7. The steer-by-wire system of claim 1, wherein the controller is to activate the actuator based on an angle of a steering wheel of the vehicle.

8. The steer-by-wire system of claim 1, wherein the controller is to operate the actuator based on commands from an autonomous driving mode program.

9. The steer-by-wire system of claim 1, wherein an output shaft of the motor is aligned along an axis that is parallel to and offset from a longitudinal axis of the rack.

10. The steer-by-wire system of claim 1, wherein an outer surface of the ball nut has first splines, the actuator includes a ring gear disposed around the ball nut, and an inner surface of the ring gear has second splines engaged with the first splines on the ball nut.

11. The actuator of claim 10, wherein the first splines extend partially around a circumference of the ball nut.

12. The actuator of claim 10, wherein the motor has a pinion engaged with the ring gear.

13. The actuator of claim 1, wherein the ball nut is a double recirculating ball nut.

14. A vehicle comprising:
    a steering knuckle;
    a wheel carried by the steering knuckle; and
    a steer-by-wire system including a controller and an actuator to move the steering knuckle, the actuator including:
        a rack coupled to the steering knuckle;
        a ring gear having an internal nut, the nut defining an opening, the rack extending through the opening of the nut;
        a motor to drive the ring gear to rotate the nut;
        a slide locator including an arm extending from the rack and a sleeve carried on an end of the arm; and
        a slide rod extending through the sleeve, an interface between the slide locator and the slide rod to prevent the rack from rotating.

15. The vehicle of claim 14, wherein the arm is coupled to and extends from an end of the rack.

16. The vehicle of claim 14, wherein the actuator includes a housing, the nut disposed within the housing, the slide rod coupled to and extending from the housing such that the slide rod remains stationary relative to the housing.

17. The vehicle of claim 16, further including a cross-bar, the housing coupled to the cross-bar.

18. The vehicle of claim 14, wherein the steering knuckle is a first steering knuckle, the wheel is a first wheel, and the actuator is a first actuator, further including:
    a second steering knuckle;
    a second wheel carried by the second steering knuckle; and
    a second actuator to move the second steering knuckle.

19. The vehicle of claim 14, wherein the vehicle is an autonomous driving vehicle.

20. The vehicle of claim 14, wherein the rack is coupled to the steering knuckle via a tie rod.

* * * * *